(12) United States Patent
Lynch

(10) Patent No.: US 8,084,533 B2
(45) Date of Patent: Dec. 27, 2011

(54) PARTICULATE MATERIALS

(76) Inventor: Daniel Eric Lynch, Coventry (GB)

( * ) Notice: Subject to any disclaimer, the term of this patent is extended or adjusted under 35 U.S.C. 154(b) by 827 days.

(21) Appl. No.: 11/579,271

(22) PCT Filed: May 5, 2005

(86) PCT No.: PCT/GB2005/001710
§ 371 (c)(1),
(2), (4) Date: Dec. 21, 2007

(87) PCT Pub. No.: WO2005/105885
PCT Pub. Date: Nov. 10, 2005

(65) Prior Publication Data
US 2008/0188611 A1    Aug. 7, 2008

(30) Foreign Application Priority Data
May 5, 2004   (GB) ................... 0410015.2

(51) Int. Cl.
| | | |
|---|---|---|
| *C08L 39/04* | (2006.01) | |
| *C08L 39/00* | (2006.01) | |
| *C08G 61/12* | (2006.01) | |
| C08F 26/06 | (2006.01) | |
| C03C 11/00 | (2006.01) | |
| C04B 38/00 | (2006.01) | |

(52) U.S. Cl. ......... 524/548; 526/263; 528/423; 528/424

(58) Field of Classification Search .................. 524/548; 526/263; 528/423, 424
See application file for complete search history.

(56) References Cited

FOREIGN PATENT DOCUMENTS
| | | |
|---|---|---|
| DE | 3246319 A1 | 6/1984 |
| EP | 0300543 A1 | 1/1989 |
| EP | 0603939 A2 | 6/1994 |

OTHER PUBLICATIONS

Ajayaghosh, A., *Chem. Soc. Rev.* 32: 181-191 (2003).
Chenthamarakshan, C.R. et al., *Tetrahedron Letters*, Elsevier Science Publishers, 39(13): 1795-1798 (1998).
Chenthamarakshan, C.R. et al., *Chem. Mater.* 10: 1657-1663 (1998).
Chenthamarakshan, C.R. et al., *Macromolecules* 32(18): 5846-5851 (1999).
Fowler, C. E. et al., *J. Mater. Chem.* 11: 1968-1971 (2001).
van Bommel, K.J.C. et al., *Advanced Materials* 13(19): 1472-1476 (2001).
Thieme Rompp Online, Polypyrrole, http://www.roempp.com, 2010.

*Primary Examiner* — Duc Truong
(74) *Attorney, Agent, or Firm* — The McCallum Law Firm, P.C.; Jennifer M. McCallum

(57) ABSTRACT

The present invention provides the use of a particulate polymer material as a support for an active agent, characterized in that said polymer material is a polymer produced by copolymerizing an unsaturated heterocyclic monomer and squaric or croconic acid or a derivative thereof.

13 Claims, No Drawings

PARTICULATE MATERIALS

CROSS-REFERENCE TO RELATED APPLICATIONS

The present application is a U.S. national phase filing under 35 U.S.C. 371 of PCT application No. PCT/GB2005/001710, filed May 5, 2005, which claims the benefit of United Kingdom Patent Application No. 0410015.2, filed May 5, 2004, each of which are hereby incorporated by reference in their entirety.

This invention relates to particulate polymers and particulate glasses prepared therefrom, to their use as reservoirs or encapsulating agents, to reservoir and encapsulating agent compositions and to materials containing such compositions, in particular to materials in which the basic polymer is prepared using the combination of an unsaturated heterocyclic monomer and a mono-unsaturated four or five membered dihydroxyl, di- or tri-oxo monomer, i.e. squaric acid or croconic acid, or an activated derivative thereof.

In many technical fields, particulate substrate materials are used as reservoirs for or to encapsulate chemical compounds having desirable properties, e.g. colorants, diagnostic agents, catalysts, growth media, etc.

Typical such particular substrate materials include porous, solid and hollow organic (e.g. polymeric) and inorganic (e.g. silicaceous) particles.

In the case of these particulate substrate materials, it is frequently complex or expensive to achieve the desired properties in terms of particle size, particle size distribution, porosity, loading characteristics, release characteristics, solvent penetrability, etc. This is particularly the case for hollow particulate substrates. Accordingly there is a continuing need for new materials having desirable properties as substrates.

A class of polymers produced by copolymerisation of unsaturated heterocyclic monomers and squaric or croconic acid has been investigated for their optoelectronic properties. See for example the review article by Ajayaghosh in Chem. Soc. Rev. 32: 181-191 (2003), the contents of which is hereby incorporated by reference. Such polymers however have not been suggested to have any utility as substrate materials and indeed many were dismissed as useless in view of their "intractable nature" (see Ajayaghosh (supra) at page 186, left hand column) as they formed an insoluble material on solution polymerisation.

We have found however that such intractable materials have properties which make them particularly suitable for use as particulate substrates, in particular their abilities to absorb compounds of interest, to be coated with inorganic glass layers, to shrink in a controlled manner upon heating, to produce hollow permeable glass spheres on thermal degeneration of the polymer core, etc.

Thus viewed from one aspect the invention provides the use of a particulate polymer material as a support for an active agent, characterised in that said polymer material is a polymer produced by copolymerising an unsaturated heterocyclic monomer and squaric or croconic acid or a derivative thereof.

Viewed from a further aspect the invention provides the use of a hollow particulate glass as a support for an active agent, characterised in that said hollow particulate glass is produced by pyrolysis of a glass-coated polymer produced by copolymerising an unsaturated heterocyclic monomer and squaric or croconic acid or a derivative thereof.

The particulate polymer material used according to the invention is preferably one prepared by solution polymerisation of the monomers in a solvent in which the growing polymer becomes insoluble, i.e. such that insoluble polymer particles form within the polymerisation mixture. The solvent used may be any appropriate organic solvent, preferably an alcohol, e.g. a $C_{1-14}$ alkanol such as butan-1-ol, hexan-1-ol, decan-1-ol, tetradecanol and hexadecanol, preferably a $C_{2-6}$ alkanol, more preferably butan-1-ol.

The heterocyclic monomer may comprise a single heterocyclic ring (preferably a pyrrole ring) or two or more heterocyclic rings linked via a fused ring, a bond, or a non-fused ring or a chain optionally incorporating a ring structure. The heterocycle ring(s) taking part in the polymerisation reaction are preferably five membered rings containing a nitrogen atom which either are unsubstituted at a position adjacent the nitrogen (or at both positions adjacent the nitrogen if only one heterocyclic ring is active in the polymerisation reaction) or are substituted at that position by a methylene group. Examples of the types of structure feasible are shown in Ajayaghosh (supra). Particularly preferably the heterocyclic group is a 2,5-unsubstituted pyrrole or a 5,5'-unsubstituted-2,2'-bis-pyrrole. In such compounds the 1, 3 and 4 positions may if desired be substituted, e.g. by optionally substituted alkyl, aralkyl or aryl groups. Typically optional substitution of such groups might be by hydroxy, thiol, amino, oxo, oxa, carboxy, etc. groups and substituted versions thereof (e.g. with alkoxy, alkylamino, carboxyalkyl, alkyl, aryl or alkaryl substitution). In the case of the 2,2'-bis pyrroles, linkage of the pyrrole groups may be for example via a bond, a chain (e.g. a methylene or polymethylene chain or a substituted chain such as 9-ethylcarbyl), a saturated or unsaturated ring (e.g. a furan, thiophene, benzene, bisphenyl, pyridine, anthracene or stilbenyl ring) or a chain interrupted by a ring (e.g. vinyl-phenyl-vinyl). Desirably the monomer is selected such that in the backbone of the polymer product double bonds are in alternating positions, i.e. such that a delocalised electron system along the polymer is feasible.

Thus in a particularly preferred embodiment, the polymer has the structure

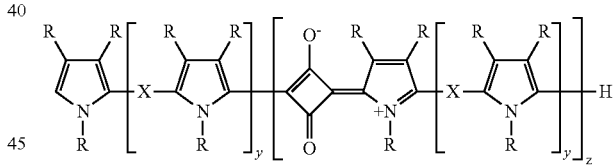

where each R, which may be the same or different, is hydrogen or optionally substituted alkyl; X is a bond or a bridging group; y is zero or a positive integer (e.g. 1, 2, 3 or 4) and z is a positive integer the value whereof determines the molecular weight of the polymer As may readily be realised, where y>1, the heterocyclic monomer may itself be a pre-prepared polymer or oligomer.

In the heterocyclic monomer, the ring nitrogen is preferably unsubstituted or alkyl, especially methyl, substituted.

In the monomers used, any alkyl or alkylene moiety, unless otherwise specified, preferably contains up to 6 carbon atoms; any ring is preferably 5, 6 or 7 membered containing 0, 1 or 2 heteroatoms, especially O, N or S atoms; and any fused ring system preferably contains 2 or 3 rings.

The polymer beads formed in this way will typically be substantially monodisperse with a particle size of 0.1 to 5 μm (defined as the maximum diameter for which at least 90% by volume are as large or no larger—this can be determined using a Coulter particle size measuring apparatus). The particle size may be reduced, substantially uniformly, by heating to a temperature beneath that at which pyrolysis begins, e.g. to a temperature of 400-500° C., especially 430 to 450° C.

The "active agent" (or its precursor) may be absorbed into such particles from solution, e.g. in an aqueous or organic solvent. The active agent or precursor used in this respect may be any organic or inorganic compound or compound mixture capable of exhibiting desired characteristics in the end product. Thus for example it may be an organic or inorganic dye or dye precursor (a term which is used herein to include visible light absorbers as well as fluorescent and phosphorescent materials), an organic, inorganic or organometallic catalyst or catalyst precursor, a biological material (e.g. a bacterium or virus), a radiochemical, a diagnostic agent (e.g. a paramagnetic or super-paramagnetic material, an X-ray opaque material, a fluorocarbon etc.), a binding agent (e.g. an antibody or antibody fragment), etc. If desired, the particles may be used to carry a compound mixture (i.e. at least two compounds) rather than a single "active" compound. Where this is to be done, the particle may be impregnated sequentially or simultaneously with solutions of the compounds to be impregnated into the particles. If desired, the active agent may be a reagent for a desired reaction and indeed different batches of particles may be loaded with different reagents and then mixed so that reaction occurs when the reagents are released. In general however, where the polymer substrate is to be pyrolysed, either the material loaded onto the particles is a metal or pseudo-metal compound (e.g. an inorganic compound) or the material is loaded after pyrolysis of glass coated polymer particles.

In a particularly preferred embodiment of the invention, the uncoated polymer particles are loaded with a metal compound in dissolved form, e.g. a dissolved oxide, chloride, sulphate, nitrate, phosphate, acetate, etc. or with an organometallic compound, e.g. a metal alkyl or alkoxide. In this way it appears that virtually any element may be loaded into the particles.

If it is desired to produce glass-coated or hollow glass particles, the polymer particles may be contacted with a ceramic precursor, e.g. a metal or pseudo-metal alkoxide. Heating such treated polymer particles generates a glass (i.e. ceramic) shell by virtue of the decomposition of the alkoxide. Heating to the temperature at which the polymer pyrolizes generates a hollow glass particle containing the preloaded active agent (if any). Typically such pyrolysis occurs at temperatures above 600° C., e.g. 650-700° C. In this context it will be realised that the "glass" need not be a silica glass but may be any other metal or pseudo-metal ceramic, e.g. zirconia, titania, hafnia, etc. As zirconia, etc. may function catalytically, the glass shell itself may be or contain the "active agent".

We have surprisingly found that such glass shells, unlike the shells of known hollow silica microspheres, are surprisingly and advantageously permeable. This permits active agents or precursors to be loaded into the particles post glass shell formation and also permits active agents to leach out of the shells or liquids (e.g. water) to leach in. Such glass-shelled particles thus are particularly suitable for use as reservoirs for active agents, e.g. for delayed release in vivo or ex vivo. One particularly preferred use of such loaded hollow glass shells is thus for delayed release of phosphorescent materials into coating or surface materials.

Thus viewed from a yet further aspect the invention provides a particulate composition comprising substrate particles containing an active agent, said substrate particles being particles of a polymer produced by copolymerising an unsaturated heterocyclic monomer and squaric or croconic acid or a derivative thereof, optionally coated with a glass-forming coating, or particles of a polymer produced by copolymerising an unsaturated heterocyclic monomer and squaric or croconic acid or a derivative thereof coated with a glass-forming coating and pyrolysed, said composition optionally further containing a carrier and optionally further containing a matrix-forming material.

The carrier in such compositions may typically be a liquid, e.g. water or an organic solvent.

The matrix forming agent in such compositions may typically be a paint, varnish, lacquer, cement or concrete base, i.e. a material which will harden to produce a solid or film in which the particles are embedded.

Viewed from a yet further aspect the invention provides the use of a particulate composition according to the invention as an absorbent, a catalyst, a dye, a delayed release agent, a contrast agent, a chromatographic medium or a reagent for a chemical reaction.

If desired, the glass-forming reagent may be heated in a reducing medium (e.g. a hydrogen atmosphere) to produce a metal or pseudo-metal shell rather than a glass shell. The resulting particulates and their uses also form part of the present invention.

Where the polymer is impregnated with a metal compound, it can be pyrolysed to yield hollow particles of compounds of that metal. The resulting particulates and their uses also form part of the present invention. These may include hollow titania, silica or iron oxide shells as described below which may be used as they are or may be loaded with other active agents.

The invention will now be illustrated further with reference to the following non-limiting Examples.

EXAMPLE 1

Preparation of Poly(1-methylpyrrol-2-ylsquaraine)

Poly(pyrrol-2-ylsquaraine)s are prepared by refluxing equimolar amounts of the pyrrole derivative and squaric acid in an alkyl alcohol (or a solvent mix containing an alkyl alcohol). A typical preparation procedure based on the use of 1-methylpyrrole is as follows: equimolar amounts of 1-methylpyrrole and squaric acid were refluxed in butan-1-ol for 16 hours. Upon cooling the crude product was filtered and dried. Soluble small molecular weight materials were removed by repeatedly washing the product with ethyl acetate for 16 hours in a Soxhlet.

The pyrrole derivatives used were pyrrole, 1-methyl-pyrrole, 2,6-bis(1-methylpyrrol-2-yl)-pyridine, a,b-bis(1-methylpyrrol-2-yl)anthracene, 2,2'-bis(1-methylpyrrole), and 1-acetoxyethyl-pyrrole. A scanning electron microscope picture of the poly(1-methylpyrrol-2-yl-squaraine) is shown in Figures 1.

EXAMPLE 2

Absorption of Metal Ions by poly(1-methylpyrrol-2-ylsquaraine)

Poly(pyrrol-2-ylsquaraine)s can absorb elemental ions by soaking in an aqueous acidic solution containing dissolved elemental salts. Table 1 lists the metal ions that have been absorbed by poly(1-methylpyrrol-2-yl-squaraine). Table 1 includes the elemental salt and the acid used to dissolve that salt.

1 gram of poly(1-methylpyrrol-2-yl-squaraine) was added to a 30 $cm^3$ conc. acid or aqueous acid solution containing 1 gram of dissolved elemental compound, or a mixture of elemental compounds. The mixture was stirred for 5 minutes and then sonicated for three seconds followed by a further stirring for 25 minutes. The poly(1-methylpyrrol-2-yl-squaraine) was then removed from the mixture by filtration.

TABLE 1

| Atomic No. | Element | Reactant compound dissolved in acid | Acid used | Elemental inorganic compound produced in shells |
|---|---|---|---|---|
| 3 | Li | LiCl | HCl | $Li_2SiO_3$, $Li_2Si_2O_5$, $SiO_2$ |
| 5 | B | $H_3BO_3$ | — | ucc B |
| 11 | Na | NaCl | HCl | NaCl, $Na_2Si_2O_5$, $SiO_2$ |
| 12 | Mg | $Mg(CH_3CO_2)_2 \cdot 6H_2O$ | HCl | MgO |
| 13 | Al | $AlCl_3 \cdot 6H_2O$ | HCl | ucc Al, Cl, S |
| 15 | P | $(NH_3)H_2PO_4$ | $H_3PO_4$ | $SiP_2O_7$, $Si_3(PO_4)_4$, $SiP_2O_7$, $SiO_2$ |
| 19 | K | $K(CH_3CO_2)$ | HCl | KCl |
| 20 | Ca | $CaCl_2$ | HCl | ucc Ca |
| 21 | Sc | $ScCl_3$ | HCl | $Sc_2O_3$ |
| 22 | Ti | Ti | $H_2SO_4$ | ucc Ti, S |
| 23 | V | $VCl_3$ | HCl | $VO_2$, $V_8O_{15}$, $V_2O_5$ |
|  | V=O | $VOSO_4 \cdot H_2O$ | HCl | $VO_2$ |
| 24 | Cr | $CrCl_3 \cdot 6H_2O$ | HCl | $Cr_2O_3$ |
| 25 | Mn | $MnCl_2 \cdot 10H_2O$ | HCl | $Mn_2O_3$ |
| 26 | Fe | $FeCl_2 \cdot 4H_2O$ | HCl | $Fe_2O_3$ |
| 27 | Co | $CoCl_2 \cdot 2H_2O$ | HCl | $Co_3O_4$ |
| 28 | Ni | $NiCl_2 \cdot 6H_2O$ | HCl | NiO |
| 29 | Cu | $CuCl_2 \cdot 2H_2O$ | HCl | CuO |
| 30 | Zn | $ZnCl_2$ | HCl | ZnO |
| 32 | Ge | $GeO_2$ | HCl | Ge, $GeO_2$ |
| 33 | As | $As_2O_3$ | HCl | ucc As |
| 37 | Rb | RbCl | HCl | RbCl |
| 38 | Sr | $SrCl_2 \cdot 6H_2O$ | HCl | $SrO_2 \cdot 8H_2O$, $Sr(OH)_2 \cdot 8H_2O$ |
| 39 | Y | $YCl_3 \cdot 6H_2O$ | HCl | $Y_2O_3$ |
| 40 | Zr | $ZrOCl_2 \cdot 8H_2O$ | HCl | $ZrO_2$ |
| 41 | Nb | $Nb_2O_5$ | HCl | $Nb_2O_5$ |
| 42 | Mo | $MoO_3$ | $H_2SO_4$ | ucc Mo, S |
| 44 | Ru | $RuCl_3 \cdot H_2O$ | HCl | $RuO_2$ |
| 45 | Rh | $RhCl_3 \cdot H_2O$ | HCl | $Rh_2O_3$, $HRhO_2$ |
| 46 | Pd | $Pd(NO_3)_2$ | HCl | PdO |
| 47 | Ag | $Ag_2SO_4$ | $H_2SO_4$ | Ag |
| 48 | Cd | $CdCl_2 \cdot H_2O$ | HCl | $CdSiO_3$, CdO |
| 49 | In | $InCl_3 \cdot 4H_2O$ | HCl | $In_2O_3$ |
| 50 | Sn | $SnCl_2 2H_2O$ | HCl | $SnO_2$ |
| 51 | Sb | $Sb_2O_3$ | HCl | ucc Sb |
| 55 | Cs | CsCl | HCl | $CsO_2$, CsOH |
| 56 | Ba | $BaCl_2 \cdot 2H_2O$ | HCl | $BaCl_2 \cdot H_2O$, $Ba_4Cl_6O$, $BaCl_2 \cdot Ba(OH)_2$ |
| 57 | La | $LaCl_3 \cdot 7H_2O$ | HCl | LaOCl |
| 58 | Ce | $CeCl_3 \cdot 7H_2O$ | HCl | $CeO_2$ |
| 59 | Pr | $PrCl_3 \cdot 6H_2O$ | HCl | PrOCl |
| 60 | Nd | $Nd(CH_3CO_2)_3 \cdot H_2O$ | HCl | NdOCl, $Nd_2O_3$ |
| 62 | Sm | $Sm_2O_3$ | HCl | SmOCl, $Sm_2SiO_4$, $Sm_4(SiO_4)_3$ |
| 63 | Eu | $Eu_2O_3$ | HCl | $Eu_2O_3$ |
| 64 | Gd | GdO | $H_2SO_4$ | $Gd_2O_2SO_4$, $Gd_2O_3$ |
| 65 | Tb | $TbCl_3 \cdot 6H_2O$ | HCl | $Tb_4O_7$ |
| 66 | Dy | $DyCl_3 \cdot 6H_2O$ | HCl | $Dy_2O_3$ |
| 67 | Ho | $HoCl_3 \cdot 6H_2O$ | HCl | $Ho_2O_3$ |
| 68 | Er | $ErCl_3 \cdot 6H_2O$ | HCl | $Er_2O_3$ |
| 69 | Tm | $TmCl_3 \cdot H_2O$ | HCl | $Tm_2O_3$ |
| 70 | Yb | $YbCl_3 \cdot 6H_2O$ | HCl | $Yb_2O_3$ |
| 71 | Lu | $LuCl_3 \cdot 6H_2O$ | HCl | $Lu_2O_3$ |
| 72 | Hf | $HfCl_4$ | HCl | $HfO_2$ |
| 73 | Ta | $TaCl_5$ | $H_2SO_4$ | $Ta_2O_5$ |
| 74 | W | $(NH_4)_{10}W_{12}O_{41} \cdot 5H_2O$ | HCl | $WO_3$, $W_{24}O_{68}$ |
| 75 | Re | $ReCl_5$ | HCl | $ReO_2$ |
| 76 | Os | $OsCl_3 \cdot H_2O$ | HCl | ucc Os |
| 77 | Ir | $IrCl_3 \cdot H_2O$ & $IrCl_3 \cdot 3H_2O$ | HCl | Ir, $IrO_2$ |
| 78 | Pt | $PtCl_4$ | HCl | Pt, $PtCl_2$, $PtCl_4$ |
| 79 | Au | $AuCl_3$ | HCl | Au |
| 81 | Tl | $Tl_2SO_4$ | $H_2SO_4$ | ucc Tl |
| 82 | Pb | $Pb(NO_3)_2$ | HCl | Pb, PbO |
| 83 | Bi | $Bi_2O_3$ | HCl | $Bi_{12}O_{15}Cl_6$, $BiSiO_5$, $Bi_{12}Cl_{14}$ | ucc = unknown compound containing . . . Gallium, selenium and mercury could also be incorporated.

Poly(pyrrol-2-ylsquaraine)s can also absorb elemental ions by soaking in an aqueous basic solution containing dissolved elemental hydroxides.

1 gram of poly(pyrrol-2-ylsquaraine) was added to a 30 cm³ aqueous solution made basic to varying concentrations (from 0-2 M) by the dissolution of inorganic bases. The mixture was stirred for 5 minutes and then sonicated for three seconds followed by a further stirring for 25 minutes. The poly(pyrrol-2-ylsquaraine) was then removed from the mixture by filtration.

EXAMPLE 3

Use of Poly(pyrrol-2-ylsquaraine)s in the Preparation of Inorganic Materials 1 gram of poly(1-methylpyrrol-2-yl-squaraine) was added to a 30 cm$^3$ conc. acid or aqueous acid solution containing 1 gram of dissolved elemental compound, or a mixture of elemental compounds. The mixture was stirred for 5 minutes and then sonicated for three seconds followed by further stirring for 25 minutes. The poly(1-methylpyrrol-2-yl-squaraine) was then removed from the mixture by filtration. Inorganic materials were produced by heating the element-containing poly-1-methylpyrrol-2-ylsquaraine) in an oven heating from room temperature to 660° C.

Figure 2 is a scanning electron microscope picture of iron oxide ($Fe_2O_3$) prepared by this method.

EXAMPLE 4

Use of Poly(pyrrol-2-ylsquaraine)s as Template Materials for the Production of Hollow Silica Shells 1 gram of poly(1-methylpyrrol-2-ylsquaraine) was added to a 30 cm$^3$ solution containing 9:1 tetraethoxysilane:ethanol. The mixture was stirred for 5 minutes and then sonicated for three seconds followed by further stirring for 25 minutes. The silicated poly(1-methylpyrrol-2-ylsquaraine) was then removed from the mixture by filtration and oven (60° C.) dried. 1 gram of the silicated poly(1-methylpyrrol-2-ylsquaraine) was added to a 30 cm$^3$ conc. acid solution. The mixture was stirred for 5 minutes and then sonicated for three seconds followed by further stirring for 25 minutes. The silicated poly(1-methylpyrrol-2-ylsquaraine) was then removed from the mixture by filtration. Hollow silica shells were produced by heating the silicated poly(1-methylpyrrol-2-ylsquaraine) in an oven heating from room temperature to 660° C.

Figure 3 shows a scanning electron microscope picture of the hollow silica shells while Figure 4 shows a transmission electron microscope picture of the same shells.

EXAMPLE 5

Use of Poly(pyrrol-2-ylsquaraine)s as Template Materials for the Production of Hollow Titania Shells 1 gram of poly(1-methylpyrrol-2-ylsquaraine) was added to 30 cm$^3$ of titanium tetraethoxide. The mixture was stirred for 5 minutes and then sonicated for three seconds followed by further stirring for 25 minutes. The titaniated poly(1-methylpyrrol-2-ylsquaraine) was then removed from the mixture by filtration and oven (60° C.) dried. 1 gram of the titaniated poly(1-methylpyrrol-2-ylsquaraine) was added to a 30 cm$^3$ conc. acid solution. The mixture was stirred for 5 minutes and then sonicated for three seconds followed by further stirring for 25 minutes. The titaniated poly(1-methylpyrrol-2-ylsquaraine) was then removed from the mixture by filtration. Hollow titania shells were produced by heating the titaniated poly(1-methylpyrrol-2-ylsquaraine) in an oven heating from room temperature to 660° C.

Figure 5 shows a scanning electron microscope picture of the hollow titania shells.

EXAMPLE 6

Use of Hollow Shells as Storage Containers for Molecules such as Organic Compounds and/or Biological Species An amount of the hollow shells were soaked in a solution of organic solvent containing a dissolved amount of an organic compound. The filled shells were removed from the mixture by filtration and washed with a small portion of pure organic solvent.

Figure 6 shows the results of filling the hollow shells with different coloured organic dyes, by the method described above. The organic solvent used in this case was chloroform.

Diclofenac Sodium salt was incorporated into the shells by using methanol, and dichloromethane/methanol and chloroform/methanol solvent mixtures.

EXAMPLE 7

Use of Hollow Shells as Storage Containers for Water-Soluble Compounds

An amount of the hollow shells were soaked in a saturated aqueous solution containing a dissolved amount of a water-soluble compound. The mixture was heated to 60° C. and cooled to room temperature four times before the filled shells were removed from the mixture by filtration and washed with a small portion of water.

This procedure was used to fill the shells with tris(ethylene-1,2-diamine)cobalt(III) trichloride.

EXAMPLE 8

Production of Inorganic Compound-Containing Silica Shells 1 gram of poly(1-methylpyrrol-2-ylsquaraine) was added to a 30 cm$^3$ solution containing 9:1 tetraethoxysilane:ethanol. The mixture was stirred for 5 minutes and then sonicated for three seconds followed by further stirring for 25 minutes. The silicated poly(1-methylpyrrol-2-ylsquaraine) was then removed from the mixture by filtration and oven (60° C.) dried. 1 gram of the silicated poly(1-methylpyrrol-2-ylslquaraine) was added to a 30 cm$^3$ conc. acid or aqueous acid solution containing 1 gram of dissolved elemental compound, or a mixture of elemental compounds. The mixture was stirred for 5 minutes and then sonicated for three seconds followed by further stirring for 25 minutes. The silicated and element-containing poly(1-methylpyrrol-2-ylsquaraine) was then removed from the mixture by filtration. Hollow silica shells containing an elemental inorganic compound were produced by heating the silicated and element-containing poly(1-methylpyrrol-2-ylsquaraine) in an oven heating from room temperature to 660° C.

EXAMPLE 9

Production of Inorganic Compound-Containing Titania Shells 1 gram of poly(1-methylpyrrol-2-ylsquaraine) was added to 30 cm$^2$ of titanium tetraethoxide. The mixture was stirred for 5 minutes and then sonicated for three seconds followed by further stirring for 25 minutes. The titaniated poly(1-methylpyrrol-2-ylsquaraine) was then removed from the mixture by filtration and oven (60° C.) dried. 1 gram of the titaniated poly(1-methylpyrrol-2-ylsquaraine) was added to a 30 cm³ conc. acid or aqueous acid solution containing 1 gram of dissolved elemental compound, or a mixture of elemental compounds. The mixture was stirred for 5 minutes and then sonicated for three seconds followed by further stirring for 25 minutes. The titaniated and element-containing poly(1-methylpyrrol-2-ylsquaraine) was then removed from the mixture by filtration. Hollow titania shells containing an elemental inorganic compound were produced by heating the titaniated and element-containing poly(1-methylpyrrol-2-ylsquaraine) in an oven heating from room temperature to 660° C.

Table 1 lists the elemental inorganic compounds obtained from the above procedure after using the initial elemental compounds and acids listed in Table 1.

The invention claimed is:

1. A particulate composition comprising:
substrate particles containing an active agent, wherein said substrate particles are particles of a polymer having the structure:

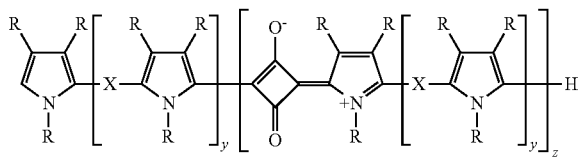

wherein R is selected from the group consisting of the same chemical group and a different chemical group and said same or different chemical group is selected from the group consisting of hydrogen and optionally substituted alkyl; wherein X is selected from the group consisting of a bond and a bridging group; y is selected from the group consisting of zero and a positive integer; z is a positive integer wherein the value of said z determines the molecular weight of said polymer and the ring nitrogen atom of the heterocyclic ring is substituted by hydrogen or methyl;
wherein said substrate particles are optionally coated with agents selected from the group consisting of a glass-forming coating and a glass-forming coating that is pyrolysed.

2. The composition of claim 1, further comprising a carrier.

3. The composition of claim 1, further comprising a matrix-forming material.

4. The composition of claim 2, wherein said carrier is selected from the group consisting of water and an organic solvent.

5. The composition of claim 3, wherein said matrix-forming material is selected from the group consisting of paint, varnish, lacquer, cement and concrete bass.

6. The composition of claim 1, wherein said particulate composition has a use selected from the group consisting of a catalyst, a dye, a release-delaying agent, a contrast agent, a chromatographic medium and a reagent for a chemical reaction.

7. The composition of claim 1, wherein y is zero.

8. The composition of claim 1, wherein said active agent is an organic or inorganic compound or compound mixture, an organic or inorganic dye or dye precursor, an organic, inorganic or organometallic catalyst or catalyst precursor, a biological material, a radiochemical, a diagnostic agent, or a binding agent.

9. The composition of claim 1, wherein said glass-forming coating is a metal or pseudo-metal alkoxide.

10. The composition of claim 1, wherein an active agent or precursor thereto is pre-loaded onto the polymer particles, with the proviso that where the polymer is to be pyrolyzed, said active agent or precursor thereto is a metal or pseudo-metal compound.

11. The composition of claim 1, wherein an active agent or precursor thereto is loaded after pyrolysis of the glass-coated polymer particles.

12. The composition of claim 1, wherein said particulate polymer material is loaded with a compound selected from the group consisting of a metal compound in dissolved form and an organometallic compound.

13. Substrate particles containing an active agent as defined in claim 1, wherein said substrate particles have a use as an absorbent.

\* \* \* \* \*